(12) United States Patent
Forlong

(10) Patent No.: US 9,623,532 B2
(45) Date of Patent: Apr. 18, 2017

(54) COOLANT RECOVERY AND WASTE SEPARATION SYSTEM

(75) Inventor: Murray Houlton Forlong, Auckland (NZ)

(73) Assignee: EIGEN SYSTEMS LIMITED, Albany (NZ)

( * ) Notice: Subject to any disclaimer, the term of this patent is extended or adjusted under 35 U.S.C. 154(b) by 167 days.

(21) Appl. No.: 14/238,977

(22) PCT Filed: Aug. 17, 2012

(86) PCT No.: PCT/NZ2012/000145
§ 371 (c)(1),
(2), (4) Date: Feb. 14, 2014

(87) PCT Pub. No.: WO2013/073957
PCT Pub. Date: May 23, 2013

(65) Prior Publication Data
US 2014/0197146 A1    Jul. 17, 2014

(30) Foreign Application Priority Data
Aug. 19, 2011 (NZ) ........................... 594683

(51) Int. Cl.
*B23Q 11/10*    (2006.01)
*B22D 11/126*    (2006.01)
(Continued)

(52) U.S. Cl.
CPC ........ *B23Q 11/1069* (2013.01); *B22D 11/126* (2013.01); *B23K 7/002* (2013.01);
(Continued)

(58) Field of Classification Search
CPC ... B23K 26/423; B23K 26/16; B23Q 11/1069
See application file for complete search history.

(56) References Cited

U.S. PATENT DOCUMENTS 4,058,299 A    11/1977  Lindkvist
4,123,333 A *  10/1978  Schulte ................ C10B 33/003
                                            202/255
(Continued)

FOREIGN PATENT DOCUMENTS

EP    0288598    11/1988
EP    1859892    11/2007

*Primary Examiner* — Tu B Hoang
*Assistant Examiner* — Erin McGrath
(74) *Attorney, Agent, or Firm* — Greer, Burns & Crain, Ltd.

(57) ABSTRACT

A machine is provided, including at least one thermal cutting head, and at least one machining head with a coolant, wherein the machine includes a plate support table which is configured to allow coolant to fall through, a gantry located above the table and configured to travel along length of the table in an X axis, a carriage which is movably mounted to the gantry to travel in a Y axis which is at right angles to the X axis, a machining head with a coolant supply and a thermal cutting head both mounted to the carriage, at least one trolley is located below the table, wherein the trolley supports a fume chamber and a coolant tray and wherein the trolley is configured to be capable in use of moving independently or synchronously with the machinery head or thermal cutting head as required to capture coolant and fumes.

9 Claims, 5 Drawing Sheets

(51) Int. Cl.

| | |
|---|---|
| *B23Q 11/00* | (2006.01) |
| *B23K 26/16* | (2006.01) |
| *B23K 7/00* | (2006.01) |
| *B23K 10/00* | (2006.01) |
| *B23K 37/04* | (2006.01) |
| *B23K 26/38* | (2014.01) |

(52) U.S. Cl.
CPC .............. *B23K 10/00* (2013.01); *B23K 26/16* (2013.01); *B23K 26/38* (2013.01); *B23K 37/0408* (2013.01); *B23Q 11/0067* (2013.01); *B23Q 11/10* (2013.01); *Y02P 70/167* (2015.11); *Y02P 70/171* (2015.11); *Y02P 70/181* (2015.11)

(56) References Cited

U.S. PATENT DOCUMENTS

| | | | |
|---|---|---|---|
| 4,409,463 A * | 10/1983 | Duruz | B23K 26/36 219/121.67 |
| 5,073,694 A | 12/1991 | Tessier et al. | |
| 6,222,155 B1 | 4/2001 | Blackmon et al. | |
| 7,084,368 B2 | 8/2006 | Yamaguchi et al. | |
| 2004/0202531 A1* | 10/2004 | Beransky | B23K 26/083 414/331.18 |
| 2008/0075545 A1 | 3/2008 | Forlong | |
| 2010/0252542 A1 | 10/2010 | Zeygerman | |

\* cited by examiner

SECTION A-A

COOLANT RECOVERY AND WASTE SEPARATION SYSTEM

The invention relates to a below plate coolant recovery and waste separation system on a machine that includes machining operations with coolant and thermal cutting systems such as with laser, plasma and oxygen cutting machinery for cutting metal plate in a profile. The invention is directed particularly, but not solely, towards providing a system to enable cutting machines fitted with various cutting heads to be able to cut profiles from plate in a dry environment and to enable the recovery of coolant during machining operations, while ensuring the waste generated by these processes on the same machine are kept separate.

BACKGROUND

The parts to be processed are profiles that are required to be cut from large flat plates which require various types of processes to be performed on each part. Typically the part will require a process to sever a part profile from a parent plate but will also require machining operations such as drilling, tapping or milling. Typically the machining operations are performed prior to the profile being cut out to ensure the part is supported by a large portion of the plate during the machining operations.

Typically, on a profile cutting machine, such as with a thermal cutting machine, the bridge of the machine is often fitted with dry cutting tools such as laser, oxy fuel and plasma cutting torches and can also be fitted with high speed spindles for machining operations (wet cutting). Thermal cutting machines (laser, plasma and oxy fuel cutting) can produce waste such as dross (oxides and impurities) and smoke or fumes, while machining operations produce metal chips and may use coolant (eg oil and/or water) to assist in the machining operations.

Currently there are two different cutting table methods for a machine that combines multiple processes on one plate where there is thermal cutting and machining. The first cutting table method is a wet table type cutting system and the second is a dry table type cutting system.

The first cutting table method (wet type) is where the cutting machine operates over a cutting table that is full of water mixed with machining oil also known as coolant and this table has built in supports to support the parent plate during the various processes. This type of table is called a wet table type system as the cutting table is a bed of water and/or cutting oil mix. Usually the height of the water level is able to be raised or lowered to allow the water level to reach or cover the plate being processed.

When this table is used for machining operations the coolant in the cutting table is able to be recycled from the cutting table and back through the spindle, (generally after going through a filter). Additionally, the water in the table (from the cutting machine) can be used to minimise smoke and fumes caused during the plasma or oxy fuel processes.

The disadvantage of this wet table type system is because the cutting tables are large, there is a huge volume of coolant oil/water mix required to fill the cutting table. Additionally, during use of the cutting machines, because the plate is sitting over the coolant it can splash up so that the plates get covered with an oily residue from the oil in the coolant which can cause handling and other process difficulties necessitating extra cleaning.

Additionally, the cost to dump and replace the coolant/water mix is high

Additionally, because the fumes, molten metal and hot dross hits the water/coolant it creates steam mixed with wet metal particles which is free to escape into the atmosphere around the machine.

The second cutting table method (dry type) is where the cutting machine operates over a table with a fume extraction system to remove the fumes and smoke caused during plasma or oxy fuel cutting processes. This is commonly known as a dry table type system. The fume extraction system is located under the plate being processed such that the air below the plate is extracted complete with the fumes. These fumes are ducted to a filter system where the dust particles in the fumes are extracted from the air such that the air vacating the filters is clean. The filter materials used in these systems due to the volume of air being processed and the fine nature of the particles being removed, necessitates that the filter medium must remain dry to prevent blocking.

Currently when a dry type system including machining operations (such as drilling) are incorporated on this style of machine i.e. dry table type system, oil mist or very small amounts of coolant with air as a mist are applied to the machining operations so as not to cause problems with the filters.

The disadvantage of this system is that any coolant that has fallen below the plate being cut will be sucked into the filters when the fume extraction is turned on so the amount of coolant during machining is kept to a minimum to ensure the filters in the fume extraction system do not get wet. The low volume of coolant reduces the cutting tool life.

Additionally, another disadvantage of this dry table type machine combined with machining operations requiring coolant, is that there is no method to separate out the coolant from the fume extraction system so the amount of cooling that can be used is minimized as it cannot be recovered.

Additionally, other problems include reduced machining speed and tool life for the machining tools as they do not receive the ideal level of cooling and lubrication when using mist cooling.

Additionally, during machining operations such as drilling with mist cooling there is no coolant available to assist to push the metal chips up out of the hole as required for deep hole drilling and this can cause tool seizure in the hole or badly scoured surfaces in the hole.

Additionally, if the machine operators increase the coolant flow then any coolant will be limited to the amount that can sit on top of the plate, the rest will fall through holes and cuts and off the edge of the plate. This coolant as used in machining operations can fall through the table and be sucked up by the dry fume extraction system and cause the filters to block and need replacing.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Object

It is an object of the invention to provide an improved below plate coolant recovery and waste separation system for a machine that combines thermal cutting heads (laser, plasma and flame) and machining operations using coolant for processing metal plate in a profile and ameliorates some of the disadvantages and limitations of the known art.

Alternatively, it is at least an object of the invention to provide the public with a useful choice.

SUMMARY

In a first embodiment the invention comprises a below plate coolant recovery and waste separation system for a machine that combines a machining head with coolant supply to the machining tools and thermal cutting heads for cutting metal plates, the machine including a gantry that is movably guided to travel on a substrate in an X axis in a horizontal plane on rails, at least one cutting tool movably mounted on a carriage that is movably guided to travel in a Y axis which is at right angles to the X axis in the horizontal plane, the carriage being movably mounted to the gantry, each of these cutting tools has its own vertical or Z axis drive and guide system and a cutting table for supporting and locating and allowing a plate to be cut, the below plate coolant recovery and waste separation system including a rolling trolley located underneath the table adapted to support a fume and dross containment chamber and coolant collection tray, wherein the trolley supporting the fume chamber and coolant tray is constructed to be movable in the X axis and guided by the cutting table, and is movable in response to the location of the cutting tools which move with the gantry along the rails to be positioned over the table and plate to be cut, during use in cutting the plate in combination such that the coolant or cutting fluid can be captured and reused and be kept separate from the dry fumes or dross generated during the thermal or other cutting processes, wherein the trolley supporting the fume chamber and coolant tray is suspended under the cutting table and the assembly includes at least one fume extraction chamber connected to an extraction fan and at least one channel tray for receiving and removing coolant, whereby the coolant recovery and waste separation system is synchronised with the movement of the cutting tools.

Preferably a controller is operatively connected to the cutting tools and to the cutting table fume containment chamber and coolant tray to enable the cutting tools on the machine to be synchronised control system software with the movement of the fume containment chamber and coolant tray and cutting table, wherein the controller can be programmed according to specific instructions.

Preferably if required for load bearing, a central parallel support member 20 can support the table and plate necessitating two travelling fume chambers and coolant trays separated by the support member 20 which is parallel to the table side members 21.

Preferably the trolley 17 assembly including fume containment chamber and coolant tray assembly can slidably move independently of the table and independently of the machine.

Preferably the cutting table includes longitudinal ductways 14 which are located underneath the table 11 and which act as ductways for the passage and removal of fumes or air under the cutting table.

Preferably the fume containment trolley consists of a hollow frame that allows fumes to be fluidly connected from the fume containment area in the trolley to the fume extraction chamber 14 which is oriented in the X axis parallel with the rails of the machine and the trolley is fitted with guide rollers which run on guides connected and parallel to the fume extraction chamber 14.

Preferably an extraction fan and filter system (not shown) is connected to longitudinal ducting 14 which has an open top (not shown) and covered with a belt that lifts up over rollers inside the ends of the trolley frame above longitudinal ductway 14 such that air evacuated from one fume chamber 14 also evacuates the fume containment chamber 8 to evacuate the fumes generated during thermal cutting processes.

Preferably a portion of the table structure includes a channel fluidly connected to the tray to allow for the drainage and removal of fluid from the cutting table.

Preferably the longitudinal ductways 14 which can extend at least the length of the system and profile cutting machine have cut outs on top such that air evacuated in longitudinal ducting 14 which has an open top 23 (on FIG. 5) and covered with a belt 24 that lifts up over rollers 25 inside the ends of the frame of above longitudinal ductway 14 such that air evacuated from one fume chamber 14 also evacuates the cross support members 17 (see FIG. 3) and through slots (not shown) in the bottom of 17 and into the fume chamber 8 to evacuate the fumes generated during thermal cutting processes.

Preferably any fumes generated by the operation of the cutting tools will enter the chamber of fume chamber 8 whereby the dry fumes will then be evacuated through at least part of tray and chamber members 14 which can extend at least the length of the system and profile cutting machine.

Preferably a portion of the tray support structure includes an exit 19 which allows fluid collected in the tray to fall into a channel 13 that is the length of the cutting table such that at any point along the X axis the exit can drain into the channel 13.

Preferably the trolley containing the fume extraction chamber and coolant collection tray support structure including at least one chamber and tray is movable to follow the machining head 4 to ensure that all coolant that falls through the plate 7 through cuts and holes in the plate 7 or off the edges of the plate 7 or following the drill tool 4 passing through the bottom of the plate 7 is collected and funneled down through 19 into a channel 13 located and provided under the length of the cutting table 11 for collection and re use of coolant.

Preferably a boxed section 17 is hollow which functions as a support and passage way for the air or fumes to go through from the fume chamber to the duct way 14, also has at least one slidable drawer adapted and shaped to allow manual or automatic removal of any solid waste which is drawn in with the fumes or air.

In a second embodiment the invention comprises a machine that combines a machining head with coolant and thermal cutting for cutting metal plates, the machine including below plate coolant recovery and waste separation system for and a gantry that is movably guided to travel on a substrate in an X axis in a horizontal plane on rails, at least one cutting tool movably mounted on a carriage that is movably guided to travel in a Y axis which is at right angles to the X axis in the horizontal plane, the carriage being movably mounted to the gantry, each of these cutting tools has its own vertical or Z axis drive and guide system, a cutting table for supporting and locating and allowing a plate to be cut, the below plate coolant recovery and waste separation system including a trolley incorporating a chamber and tray support structure being located underneath the table adapted to support a fume chamber and coolant tray, wherein the fume chamber and tray support structure are constructed to be movable in the X axis, and be movable in response to the location of the cutting tools which move with the gantry along the rails to be positioned over the table and plate to be cut, during use in cutting the plate in combination such that the coolant or cutting fluid can be captured and reused and be kept separate from other waste generated by other processes of the cutting machine or from the dry fumes generated during cutting processes or from the dry waste or dross generated during the cutting process, wherein the fume chamber and coolant tray assembly is suspended under the cutting table and the assembly includes a chamber and tray support structure comprising a frame structure for movably supporting at least one fume extraction chamber and at least one tray for receiving and removing coolant, whereby the coolant recovery and waste separation system is synchronised with the movement of the cutting tools.

BRIEF DESCRIPTION OF THE DRAWINGS

The invention will now be described, by way of example only, by reference to the accompanying drawings.

DETAILED DESCRIPTION

The following description will describe the invention in relation to preferred embodiments of the invention, dry cutting system with machining spindle coolant and under plate coolant recovery system. The invention is in no way limited to these preferred embodiments as they are purely to exemplify the invention only and that possible variations and modifications would be readily apparent without departing from the scope of the invention.

The invention seeks to provide an improved below plate coolant recovery and waste separation system for a cutting machine having a machining spindle with coolant and a dry table cutting system, to enable dry fume extraction for thermal cutting tools such as lasers, plasma and oxy fuel from below the plate being cut.

Figure 1:
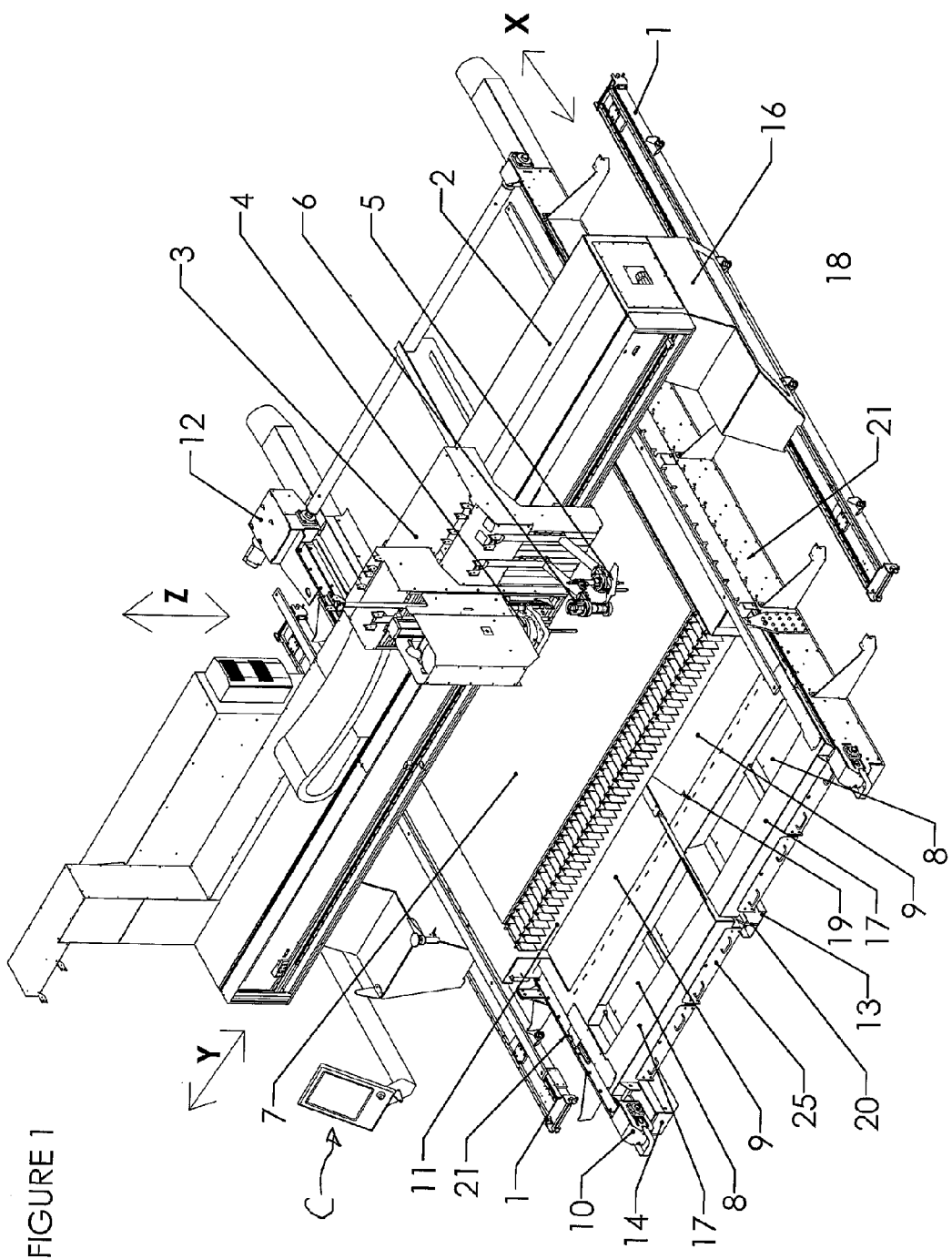
FIG. 1 is a schematic representation of the cutting machine assembly in accordance with a first preferred embodiment of the invention.

FIG. 1 is a schematic showing a wet table cutting system comprising a cutting machine which includes a machine gantry 2 that is adapted to travel when in use in an X axis along machine rails 1 and driven carriage 3 for cutting tools which is adapted to travel in a Y axis. The X and Y axis are oriented in a horizontal plane with the Y axis being at right angles to the X axis. In this embodiment there are cutting tools which are operatively all movably connected to a driven carriage 3 and are adapted to all move vertically down and up in a Z axis to process a plate 7 to be cut.

The cutting system includes a machining spindle assembly 4 and also includes the cutting tools 5 and 6 which are flame or oxy-fuel tool and plasma cutting tools.

As shown in FIG. 1, plate 7 to be cut is supported on top of a cutting table 11 which is adapted to be a cutting table plate support which suspends the plate 7 above a substrate 18. The below plate coolant recovery and waste separation system includes a trolley 17 assembly that incorporates at least one fume containment chamber 8 and at least one coolant tray 9 and is movably located underneath the cutting table. Movement of the coolant recovery and waste separation system is able to be synchronised with the movement of the cutting tools such that the appropriate waste collection system is located under its respective cutting tool.

The trolley includes fume chamber 8 and coolant tray 9 assembly being separately connected together and operatively linked by an independent drive system 12 and tensioner sprocket assembly 10 to move fume chamber 8 and coolant tray 9 under the cutting table plate support 11.

Figure 5:
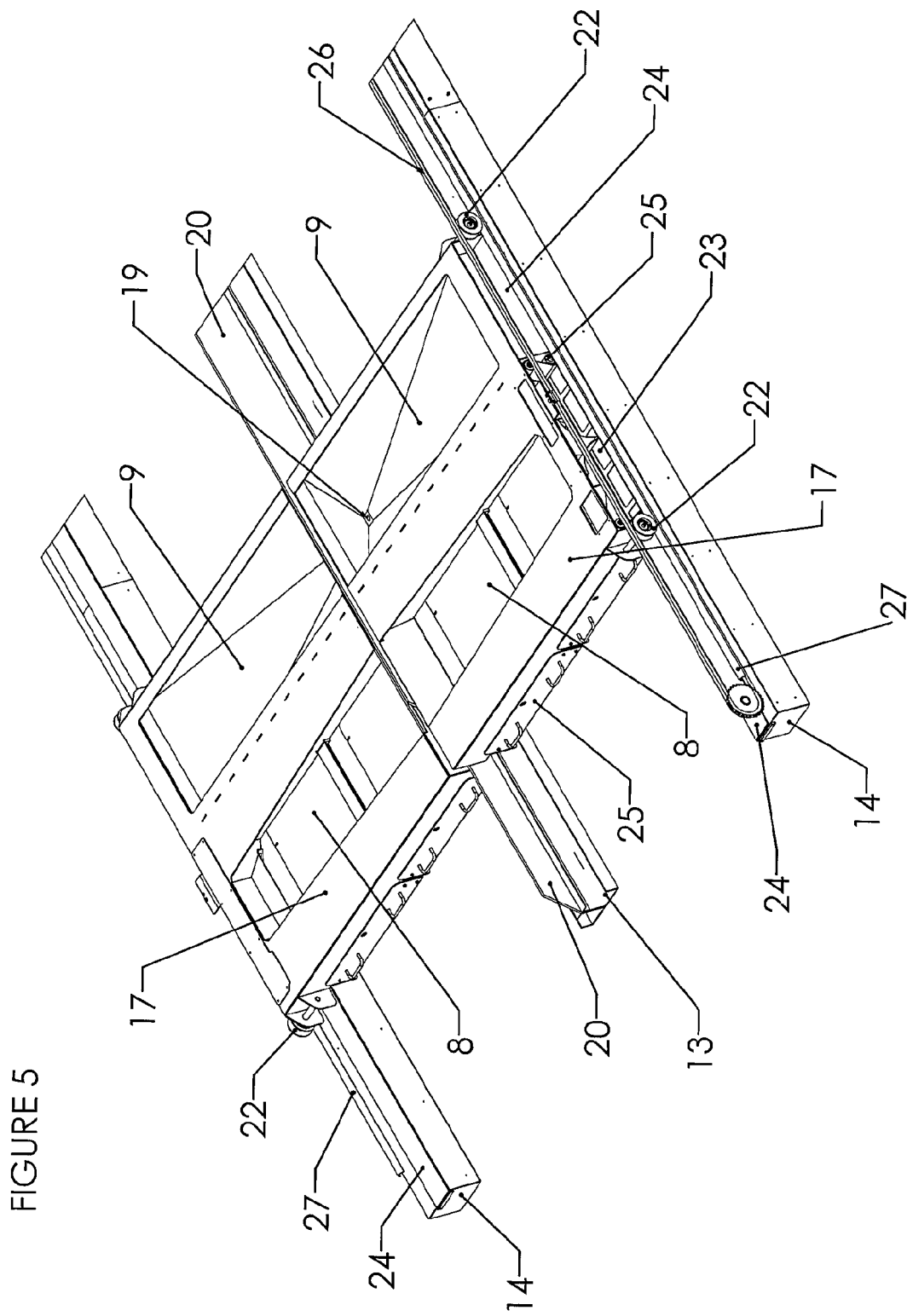
FIG. 5 is a schematic representation of the trolley assembly that is independently driven and contains separate waste collection systems where the fume and dross containment chamber collects the waste from thermal cutting systems and the coolant tray collects the coolant and machining chips from the machining operations. The table supports 21 and the rest of the machine and table system is removed for clarity.

As shown in FIG. 5 the under table trolley has a fume and dross collection chamber, fume chamber 8, such that fumes collected in this chamber are fluidly evacuated through holes under the bottom of the hollow structure of trolley 17 and evacuated towards the end of the chamber near the longitudinal fume extraction ductway 14.

Inside the end of the trolley are four belt rollers 25 (the end plate of this area containing the rollers is removed for clarity) where lower two rollers hold the belt 24 down on the surface of ductway 14 and two higher rollers keep the belt off the surface of ductway 14 inside the end of the trolley 17 so that cutouts 23 in the top of duct 14 are exposed so the air flow thru ductway 14 is fluidly connected thru into the box section frame of the trolley 17 (see FIG. 3) and where the box section has cutouts in the bottom of this section to fluidly connect this section with the fume chamber 8. The drive chain 26 is connected to the trolley 17 and driven by the drive system 12 to move the trolley along under the cutting table and the belt rollers 25 ensure the opening in the ductway 14 moves accordingly so that the internal chambers of the trolley 17 are always fluidly connected to ductway 14. The drive chain 26 though only shown on one side of the table can also be provided on the duct 14 on the opposite side. The box section of the trolley 17 is hollow which functions as a support and passage way for the air or fumes to go through from the fume chamber to the ductway 14, also has at least one slidable drawer 28 adapted and shaped to allow manual or automatic removal of any solid waste which is drawn in with the fumes or air.

Guide rollers 22 are connected to trolley 17 and these rollers sit on guide 27 shown as upturned angle iron to ensure the trolley movement is parallel to the table supports 20 and 21 where guides 27 are connected to the top of ductway 14.

Coolant tray 9 is formed as at least one tray-like member with at least one drainage means located in a lowest point 19 that enables any liquid (e.g. coolant used in machining by machining spindle 4 which is able to drop through or past the table 7) collected inside the tray 9 to travel to the lowest point 19 on the tray. From this point 19 the fluid is dropped into fluid collecting means 13 which collects the fluid to enable it to travel the length the cutting machine for collection and re-cycling from the end of fluid collecting means 13. Fluid collecting means 13 can be formed as part of the central portion of the frame that supports the fume chamber and trays.

Fluid collecting means 13 is formed as part of an elongate support member having a T shaped cross section whereby a channel is formed on at least one of the upwardly facing surfaces of the flange and web whereby the edge has an upturned flange to form the channel. The channels can extend the length of the system and be connected to a fluid pump to allow any fluid waste to be recycled back to somewhere suitable.

As shown in FIGS. 1-4 the fume chamber and tray support structure are located underneath the cutting table 11 whereby the fume chamber and tray are slidably and movably located immediately adjacent to and independently to the table side supports 21.

Figure 2:
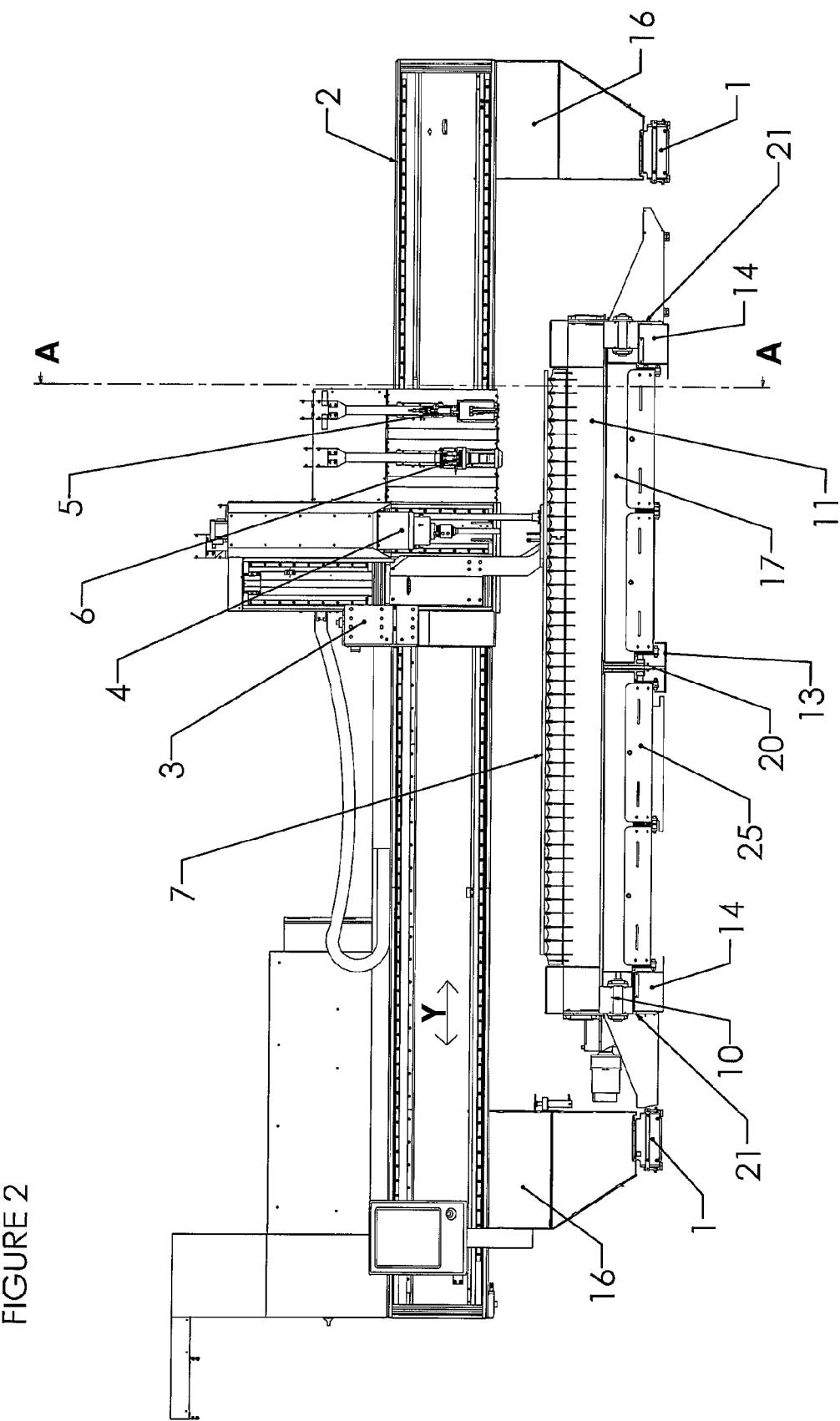
FIG. 2 is a front end view of the cutting machine of FIG. 1, showing the cutting table, plate to be cut and the end view of the under plate independently driven coolant and fume catch system.

FIG. 2 is a schematic end view showing machining spindle assembly 4 and plate 7 (plate to be cut) supported on the cutting table plate support 11 and shows a clamp foot holding the plate 7 ready for the drill in machining spindle assembly 4 to drill the plate 7.

The gantry 2 is formed of a structure that enables it to straddle or be suspended over the table. Gantry 2 includes beam and end supports 16 with the end supports 16 being movably supported on a rail 1. The rail 1 can be supported on any substrate such as for example the floor or ground.

The cutting table 11 is shown as having a central planar like structure oriented in a horizontal plane. Table 11 comprises central planar support portion 20 with table side support 21 with gusset plates for lateral support. The gusset plates are oriented at right angles to the side supports 21 and are oriented in the Y-axis to bolt the table to the substrate 18.

The machining spindle assembly 4 includes a machining spindle which incorporates through spindle coolant or external coolant and incorporates a moveable trolley system under the table structure to contain and recycle the coolant applied from, that falls below the plate 7 such as when a drill protrudes through the plate 7 at the completion of a hole/cut or from coolant falling through cuts in the plate or drilled or machined holes or around the sides of the plate.

Figure 3:
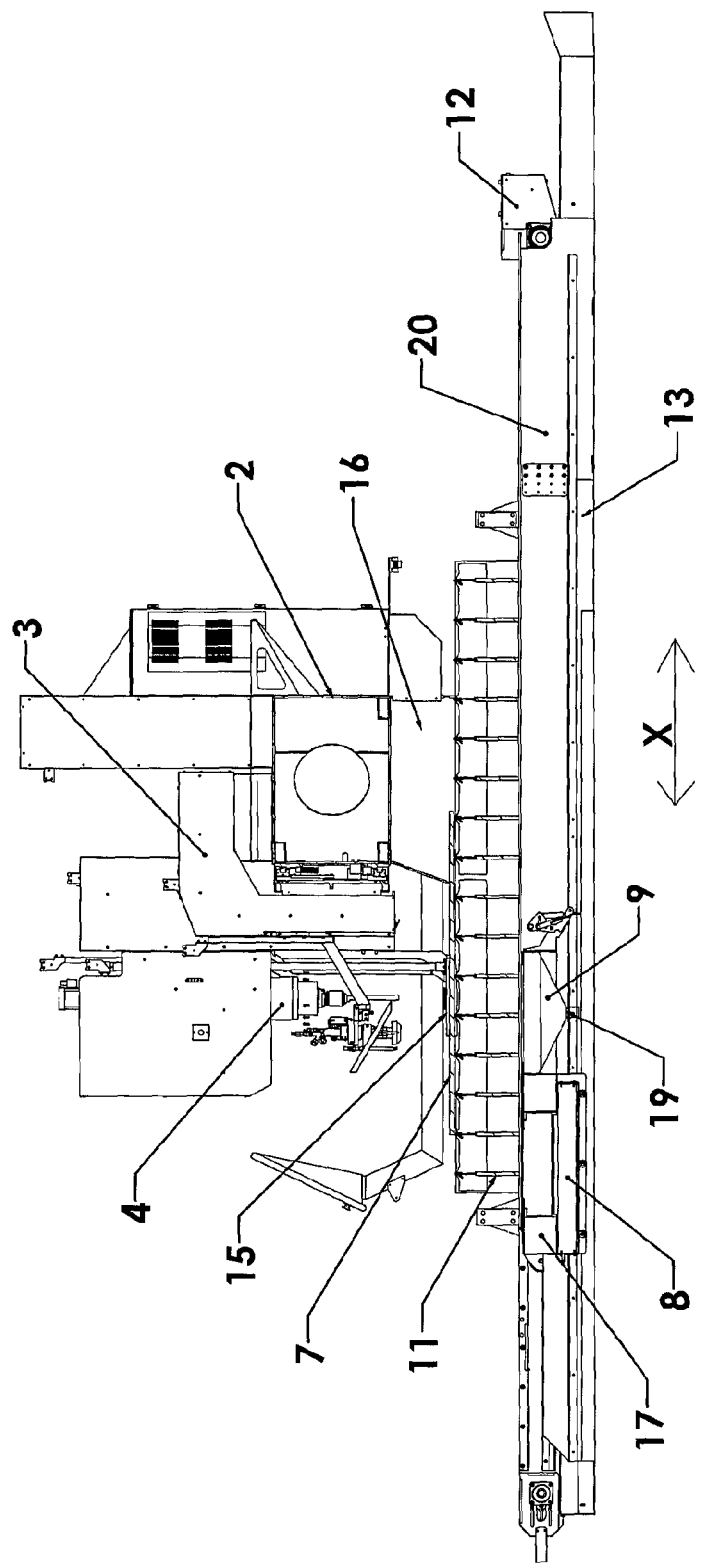
FIG. 3 is a section view of a cutting machine and table showing the machining head and chip and coolant guard lowered on the plate being cut and shows the under-plate coolant recovery system positioned below the plate and in line with the machining head.

FIG. 3 is a schematic that shows independent drive system 12 which has driven the joined fume chamber 8 and coolant tray 9 such that coolant tray 9 is positioned to be vertically and horizontally in line with machining spindle assembly 4 in the X axis during the machining operations. During the operation of machining spindle assembly 4 for various machining operations, cutting fluid coolant will be applied either through the centre the tool or alternatively via external coolant application to the tool mounted in machining spindle assembly 4.

A controller (see console C as shown in FIG. 1) is operatively connected to the cutting tools and to the cutting table and the fume chamber and coolant tray, to enable the cutting to be synchronised with the movement of the fume chamber and coolant tray and the cutting table via drive system 12. The controller is programmed according to specific instructions to enable one to control the movement of the fume chamber and coolant tray.

As shown in FIG. 3 the under plate travelling coolant tray 9 as shown, includes at least one downwardly protruding tray having sloping base to direct a fluid (e.g. coolant) to a desired at least one lowest point 19 (e.g. the centre) as shown to allow the fluid to drain through the lowest point 19 and into fluid collecting means 13. During machining operations with machining spindle assembly 4 the coolant tray 9 is slidably and independently driven by independent drive system 12 to locate this tray directly under machining head 4.

As seen in FIG. 3 there is shown a plate clamp and coolant guard 15 which is designed, during use of the cutting machine, to minimise the chip and coolant travel over the top of the plate 7. The sliding underneath movement of coolant tray 9 to follow carriage 3 is to ensure that all coolant that falls through the plate 7 through cuts in the plate 7 or off the edges of the plate 7 or following the tool in machining spindle 4 passing through the bottom of the plate 7 is collected and funneled down into a channel in fluid collecting means 13 the length of the cutting table 11 for collection and re use. The channel in fluid collecting means 13 can be continued past the machine to a container mounted below the floor (not shown) to allow pumping of coolant back to a coolant store for recycling (not shown).

Figure 4:
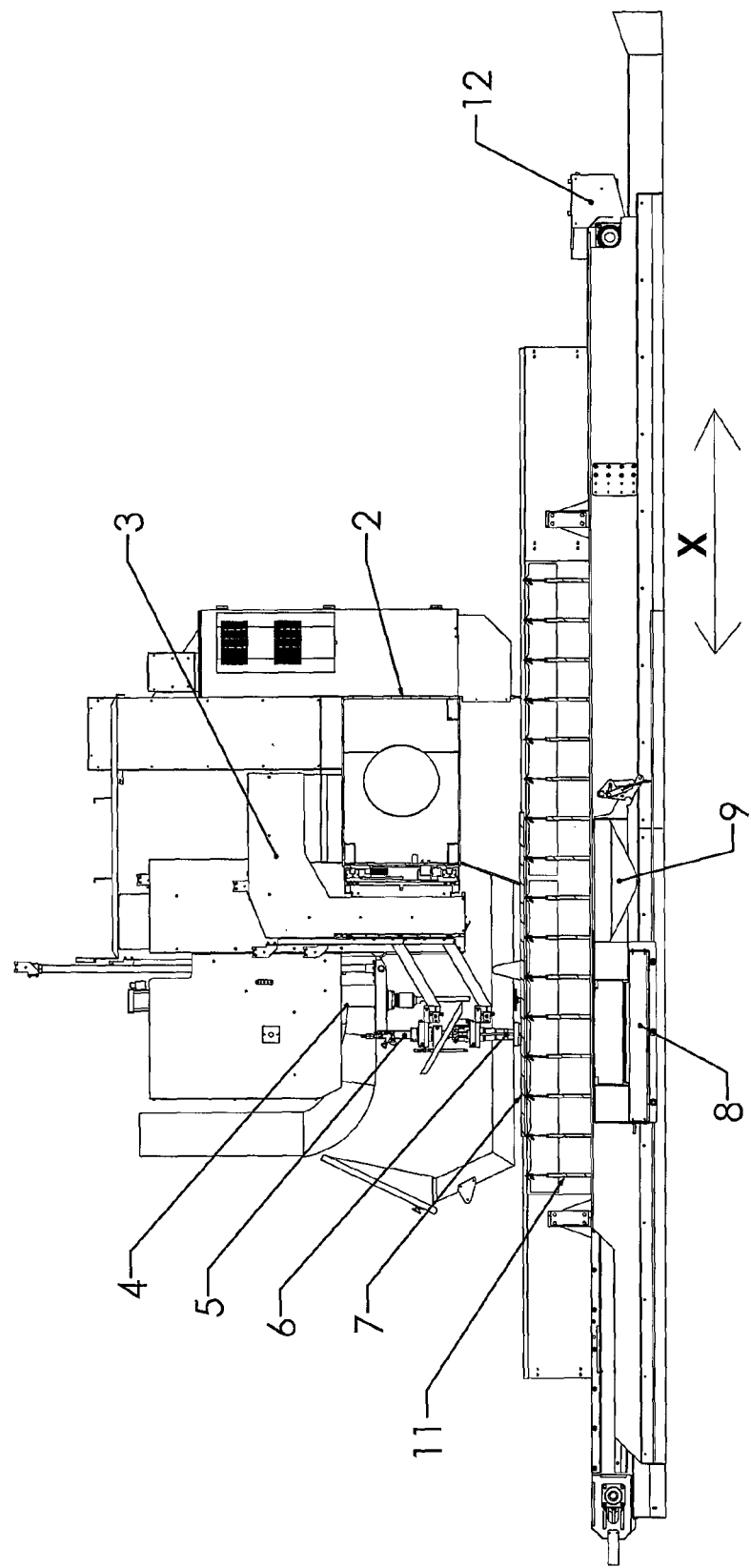
FIG. 4 is a section view of a cutting machine and table showing a plasma cutting head positioned above the plate to be cut and shows the travelling fume removal system positioned under the plasma tool.

FIG. 4 is a schematic that shows cutting tool 6 (which is a plasma cutting tool) lowered down onto plate 7 as occurs during plasma cutting operations. During operation of cutting tool 6 in cutting plate 7, independent drive system 12 will drive fume chamber 8 such that cutting tool 6 and fume chamber 8 remain vertically in line in the X axis during the full operation of cutting tool 6. During various thermal cutting processes as may occur using cutting tool 6, significant amounts of fumes may be generated by the cutting operation.

In this embodiment, any fumes generated by the operation of the cutting tools will enter the fume containment chamber 8. These dry fumes will then be evacuated through at least part of the chamber side support members (being hollow in at least part thereof) shown in FIG. 3 which can extend at least the length of the system and profile cutting machine. The fumes can be ducted away via ductway 14 and through a filter membrane system to remove fumes from the air (not shown).

The present invention in preferred embodiments may have one or more of the following advantages:
   a) Independent drive systems for under plate coolant capture and recovery system can also move to enable dry fume extraction and separate waste mixing.
   b) The under plate coolant recovery system ensures that coolant is trapped and does not mix with the dry dust and fumes generated during plasma cutting or oxy fuel cutting operations c) Significant coolant and lubrication can be applied to machining operations
   d) The under plate coolant capture and recovery system collects coolant used during machining operations and enables the coolant that falls thru the plate or around the plate can be collected to be reused
   e) Can use a smaller tray for collecting the coolant after use
   f) Save on use of coolant
   g) Save on coolant cost
   h) Minimizing emissions of smoke and fumes
   i) Optimize machine life including the cutting tools
   j) The under plate coolant capture system collects the waste or dross from the cutting process and ensures this is kept dry and separate from the coolant used for other processes.
   k) Allows for the combination of both wet and dry cutting on the one cutting machine
   l) Safer cutting by not having fumes to escape
   m) Capable of being used on any cutting able method for machine that combines multiple processes on one plate Variations Throughout the description of this specification, the word "comprise" and variations of that word such as "comprising" and "comprises", are not intended to exclude other additives, components, integers or steps. It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures. For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

Any number and types or combinations of cutting tools can be used. The table and or fume and chamber tray assembly can be formed having a solid central portion or it can be formed with apertures or spaces therein. The frame cross sections can be formed as any cross section such as for example box sections or channels which can be solid or hollow. The side supports though shown as being solid can also be formed as having hollows therein.

The fluid collecting means 13 can also be formed as different cross section and also the shape of the channel and number of channels can altered as required. The fume chamber 8 like the tray 9 can be formed in any other shapes. The fume inlet though shown as slots can be formed in any other way or shape and distribution that still allows the fumes from cutting to be sucked in to be taken away.

The number and shape of the trays and chambers can also be varied to suit various products and quantities. The fume and tray and cutting table can be formed as one piece items or as components with or without various apertures or not. Fume chamber 8 and coolant tray 9 can be connected together (i.e. side by side) or can be spaced from one another. Any number of trays and chambers are also possible. The present invention is capable of being used on any cutting machine that combines multiple processes on one plate where there is there is cutting and machining with wet type and dry type cutting methods.

Additionally all components for the table and chamber tray assembly can be formed in separate parts or components that can be assembled together. Air extraction can by any means that allows the air or fumes to be removed from the cutting machinery which could be by pushing the air out and or by drawing out.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

I claim:

1. A machine comprising:
   a plate support table configured to support a plate and to allow coolant to fall through;
   a gantry located above said table and configured to travel along length of said table in an X axis;
   a carriage which is movably mounted to the gantry to travel in a Y axis which is at right angles to the X axis;
   a machining head mounted to said carriage and configured to machine the plate, the machining head having a coolant supply;
   a thermal cutting head mounted to said carriage and configured to perform thermal cutting on the plate;
   at least one trolley located below said table, said at least one trolley including a fume chamber and a coolant tray, said fume chamber and said coolant tray each having openings that are separate from each other, and wherein said trolley moves independently from said carriage to respectively, separately capture coolant and fumes in said openings to said coolant tray and said fume chamber.

2. The machine as claimed in claim 1 wherein a controller is operatively connected to the thermal cutting head and machining head and configured to align the trolley therewith during cutting operations.

3. The machine as claimed in claim 1 wherein the machine comprises a central load support member supporting the table to enable two trolleys to be located beneath the table, one on either side of the support member.

4. The machine as claimed in claim 1 wherein the machine comprises at least one longitudinal duct located underneath the table to allow for the removal of fumes from the fume chamber.

5. The machine as claimed in claim 4 wherein the trolley includes a hollow frame that captures fumes from the fume chamber, and which is connected to, the at least one longitudinal duct.

6. The machine as claimed in claim 1 wherein a portion of the coolant tray includes an exit which allows fluid collected in the coolant tray to drain into a channel that is at least the length of the cutting table, such that at any position of the coolant tray, the fluid can drain into the channel.

7. The machine as claimed in claim 5, wherein the at least one longitudinal duct has cut outs on top which are covered with a belt that lifts up over rollers at the ends of the frame of the trolley, to fluidly connect the fume chamber and hollow frame of the trolley, with the longitudinal duct.

8. The machine as claimed in claim 4, wherein an extraction fan and filter system is connected to the at least one longitudinal duct.

9. The machine as claimed in claim 1 wherein the trolley includes a drawer which is adapted to allow the removal of any solid waste that is drawn in with the fumes or air.

* * * * *